United States Patent
Chou et al.

(10) Patent No.: US 8,298,722 B2
(45) Date of Patent: Oct. 30, 2012

(54) FUEL CELL AND FABRICATING METHOD THEREOF

(75) Inventors: Chen-Chia Chou, Taipei (TW);
Tsung-Her Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 968 days.

(21) Appl. No.: 12/350,183

(22) Filed: Jan. 7, 2009

(65) Prior Publication Data

US 2010/0173215 A1    Jul. 8, 2010

(51) Int. Cl.
*H01M 8/04*    (2006.01)
*H01M 4/92*    (2006.01)

(52) U.S. Cl. .................... 429/514; 429/487
(58) Field of Classification Search .......... 429/458–462, 429/514
See application file for complete search history.

(56) References Cited

U.S. PATENT DOCUMENTS

| | | | | |
|---|---|---|---|---|
| 5,149,601 A | * | 9/1992 | Shiratori et al. | 429/458 |
| 6,641,084 B1 | * | 11/2003 | Huber et al. | 244/48 |
| 2002/0034668 A1 | * | 3/2002 | Zhang et al. | 429/25 |
| 2003/0009035 A1 | * | 1/2003 | Matsuba et al. | 548/317.1 |
| 2005/0136294 A1 | * | 6/2005 | Tsunoda | 429/12 |
| 2005/0214612 A1 | * | 9/2005 | Visco et al. | 429/30 |
| 2006/0063046 A1 | * | 3/2006 | Hu et al. | 429/17 |
| 2006/0141323 A1 | * | 6/2006 | Ito et al. | 429/34 |
| 2007/0259242 A1 | * | 11/2007 | Schaevitz et al. | 429/34 |
| 2008/0193816 A1 | * | 8/2008 | Schaevitz et al. | 429/27 |

FOREIGN PATENT DOCUMENTS

| | | |
|---|---|---|
| CN | 2368165 Y | 3/2000 |
| CN | 1564012 A | 1/2005 |
| JP | 2002313370 A | 10/2002 |
| JP | 2004-235060 A | 8/2004 |
| JP | 2007-26925 A | 2/2007 |

* cited by examiner

*Primary Examiner* — Patrick Ryan
*Assistant Examiner* — Muhammad Siddiquee

(57) ABSTRACT

A fuel cell includes a substrate layer, a first electrode, a second electrode, a first chamber layer and a second chamber layer, and all of which are integrally formed by co-firing. The substrate layer includes a first surface and a second surface opposite to the second surface, and the first electrode, the second electrode are formed on the first and second surfaces, respectively. The first chamber layer, disposed on the first electrode, includes a first flow passage and a first fuel chamber connected thereto, and a first gas passes the first flow passage, enters the first fuel chamber and contacts the first electrode. The second chamber, disposed on the second electrode, includes a second flow passage and a second fuel chamber connected thereto, and a second gas passes the second flow passage, enters the second fuel chamber and contacts the second electrode.

18 Claims, 11 Drawing Sheets

FUEL CELL AND FABRICATING METHOD THEREOF

BACKGROUND OF THE INVENTION

1. Field of the Invention

The present invention relates to a fuel cell, and in particular relates to an easily fabricated fuel cell.

2. Description of the Related Art

FIG. 1 shows a conventional fuel cell 1, comprising a substrate 10, a first electrode 21, a second electrode 22, a first cover layer 31 and a second cover layer 32. The substrate 10 comprises a first surface and a second surface. The first electrode 21 is formed on the first surface, and the second electrode 22 is formed on the second surface. The first cover layer 31 is adhered to the first surface by an adhesive (glass cement) 40, and the second cover layer 32 is adhered to the second surface by an adhesive 40. The first cover layer 31 and the second cover layer 32 are stainless steel. Conventionally, adhesion of the adhesive 40 deteriorates with time and temperature, and the first cover layer 31 and the second cover layer 32 are thus separated from the substrate 10. Additionally, the conventional fabrication process for combining the first cover layer 31 and the second cover layer 32 to the substrate 10 by adhesive 40 is complex.

BRIEF SUMMARY OF THE INVENTION

A detailed description is given in the following embodiments with reference to the accompanying drawings.

A fuel cell is provided. The fuel cell comprises a substrate layer, a first electrode, a second electrode, a first chamber layer and a second chamber layer. The substrate layer comprises a first surface and a second surface, and the first surface is opposite to the second surface. The first electrode is formed on the first surface. The second electrode is formed on the second surface. The first chamber layer is disposed on the first electrode, wherein the first chamber layer comprises a first flow passage and a first fuel chamber, the first flow passage is connected to the first fuel chamber, and a first gas passes the first flow passage, enters the first fuel chamber and contacts the first electrode. The second chamber layer is disposed on the second electrode, wherein the second chamber layer comprises a second flow passage and a second fuel chamber, the second flow passage is connected to the second fuel chamber, and a second gas passes the second flow passage, enters the second fuel chamber and contacts the second electrode, wherein the substrate layer, the first electrode, the second electrode, the first chamber layer and the second chamber layer are integrally formed by co-firing.

In the embodiment of the invention, materials of the substrate layer, the first chamber layer and the second chamber layer are selected to be matched. Additionally, the substrate layer, the first chamber layer and the second chamber layer are co-fired to be integrally formed. The structure strength and reliability of the fuel cell is improved. As well, the fuel cell is easier assembled, and a sealing problem is prevented.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
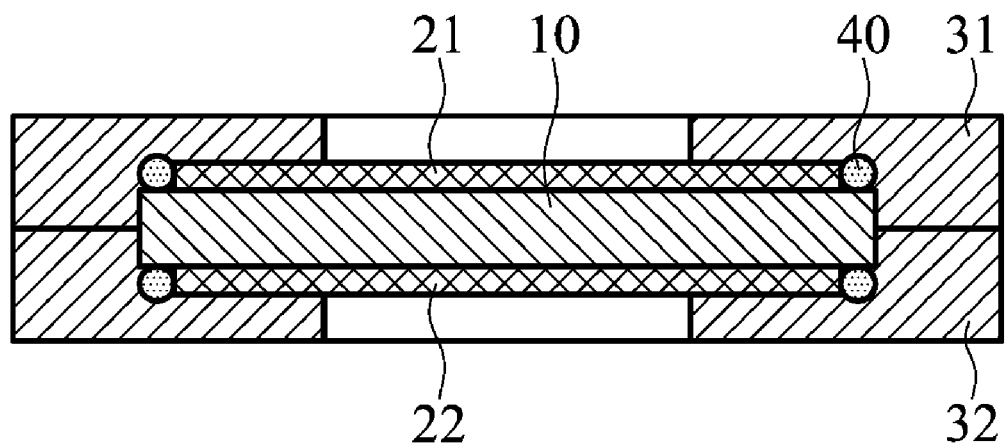
FIG. 1 shows a conventional fuel cell.
Figure 2:
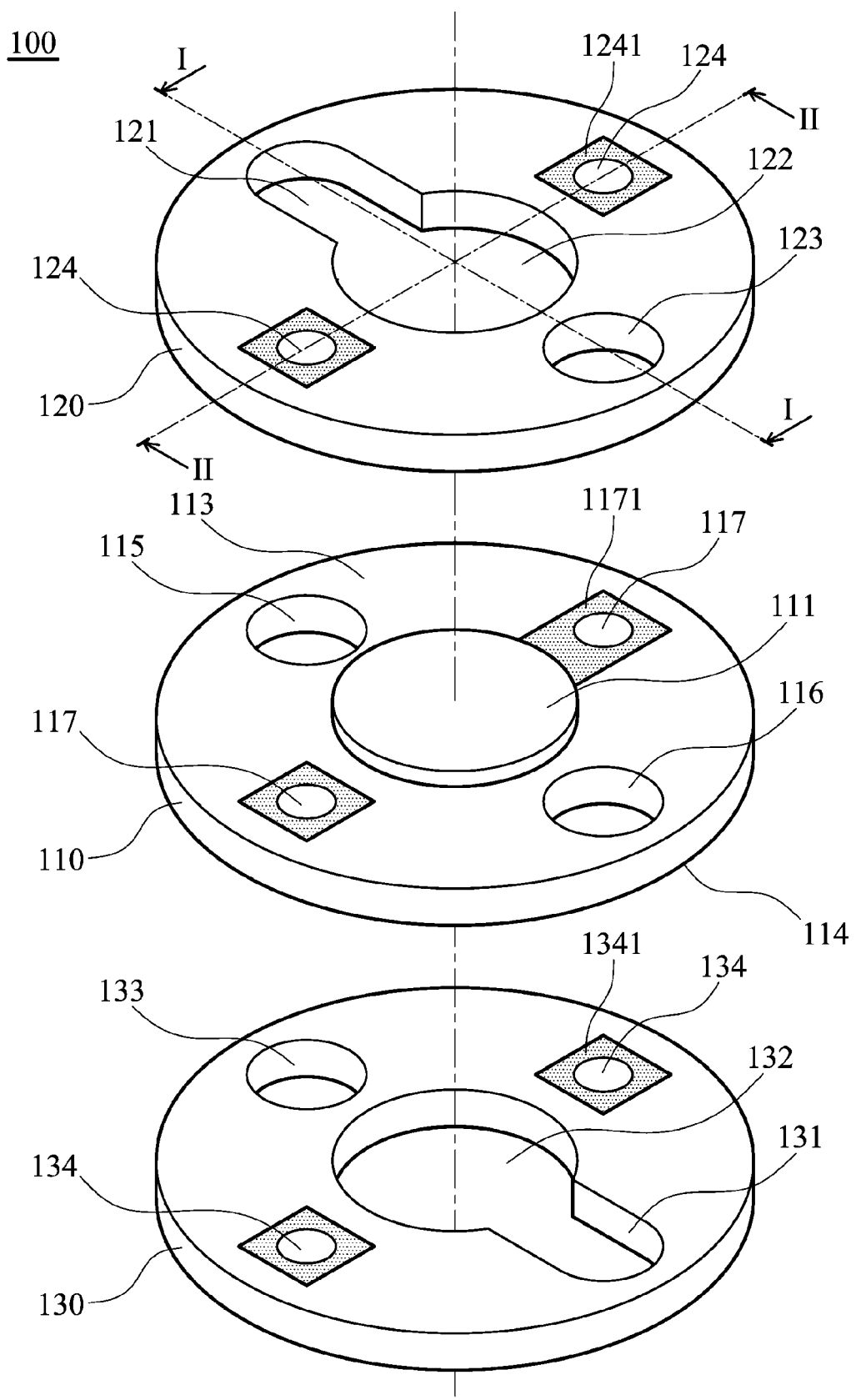
FIG. 2 is an exploded view of a fuel cell of a first embodiment of the invention.
Figure 3A:
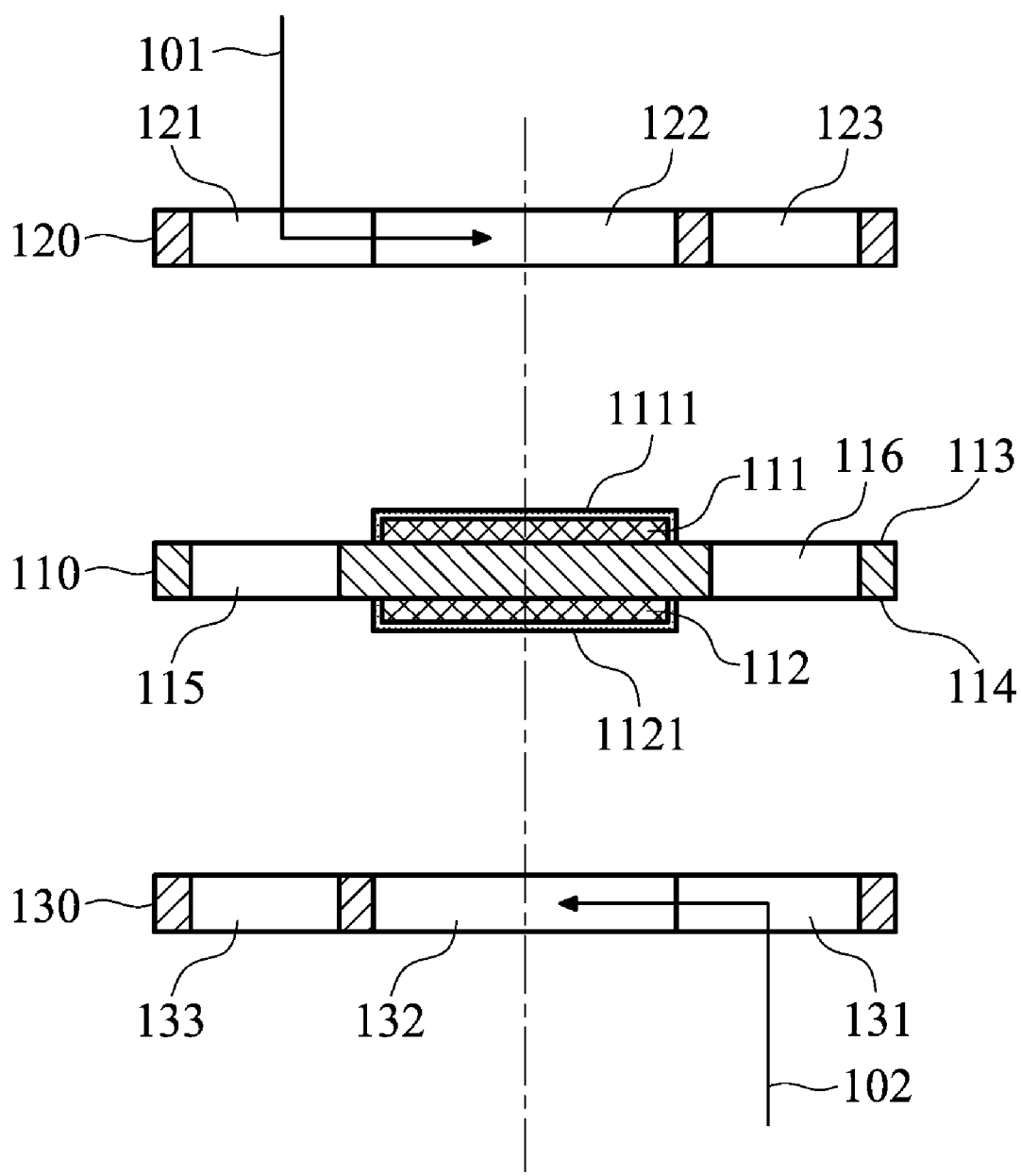
FIG. 3a is a sectional view of the fuel cell along I-I direction of FIG. 2.
Figure 3B:
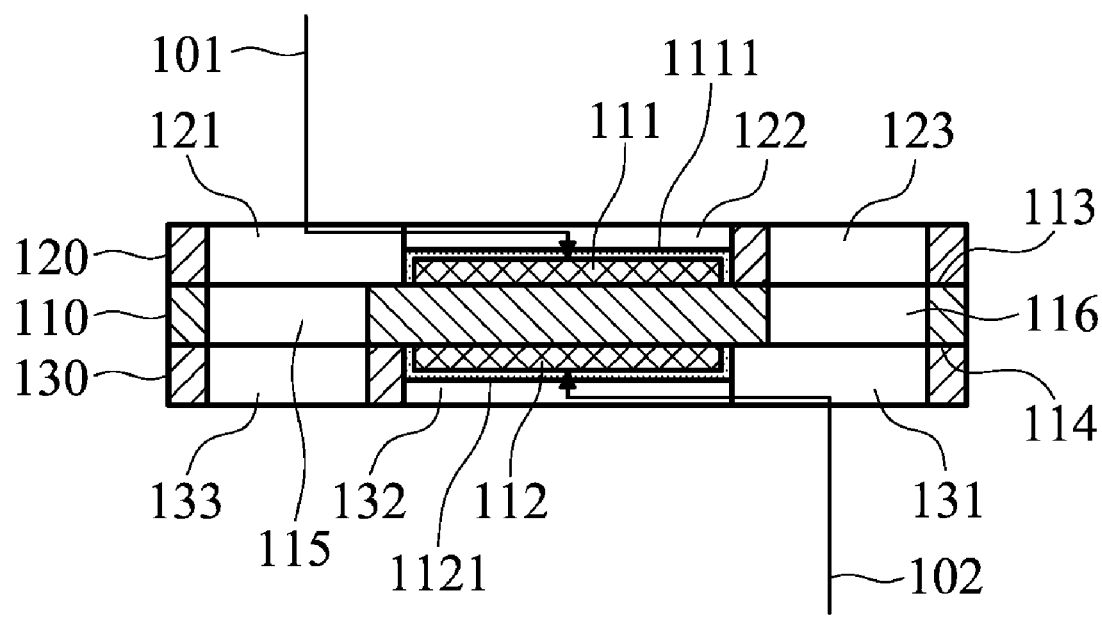
FIG. 3b is an assembly view of the first embodiment of the invention.

FIG. 2 is an exploded view of a fuel cell 100 of a first embodiment of the invention. FIG. 3a is a sectional view of the fuel cell along I-I direction of FIG. 2. FIG. 3b is an assembly view of the first embodiment of the invention. With reference to FIGS. 2, 3a and 3b, the fuel cell 100 of the first embodiment of the invention comprises a substrate layer 110, a first electrode 111, a second electrode 112, a first chamber layer 120 and a second chamber layer 130. The substrate layer 110 comprises a first surface 113 and a second surface 114. The first surface 113 is opposite to the second surface 114. The first electrode 111 is formed on the first surface 113. The second electrode 112 is formed on the second surface 114.

The first chamber layer 120 is disposed on the first electrode 111. The first chamber layer 120 comprises a first flow passage 121 and a first fuel chamber 122. The first flow passage 121 is connected to the first fuel chamber 122. A first gas (oxygen) 101 passes the first flow passage 121 entering the first fuel chamber 122 to contact the first electrode 111. The second chamber layer 130 is disposed on the second electrode 112. The second chamber layer 130 comprises a second flow passage 131 and a second fuel chamber 132. The second flow passage 131 is connected to the second fuel chamber 132. A second gas (hydrogen) 102 passes the second flow passage 131 entering the second fuel chamber 132 to contact the second electrode 121. The substrate layer 110, the first electrode 111, the second electrode 112, the first chamber layer 120 and the second chamber layer 130 are combined by co-firing.

In the first embodiment, the first fuel chamber 122 and the second fuel chamber 132 are through holes.

The first gas (oxygen) 101 is ionized into oxygen ions. The oxygen ions enter the substrate layer 110, moving to the second electrode 112, and react with the second gas (hydrogen) 102 to generate water, heat and electricity.

In the fuel cell 100 of the first embodiment, the first chamber layer 120 is disposed on the first surface 113, and the second chamber layer 130 is disposed on the second surface 114. The first chamber layer 120 further comprises a third flow passage 123. The second chamber 130 further comprises a fourth flow passage 133. The substrate 110 further comprises a fifth flow passage 115 and a sixth flow passage 116. The fifth flow passage 115 is connected to the first flow passage 121 and the fourth flow passage 133. The sixth flow passage 116 is connected to the second flow passage 131 and the third flow passage 123.

Figure 3C:
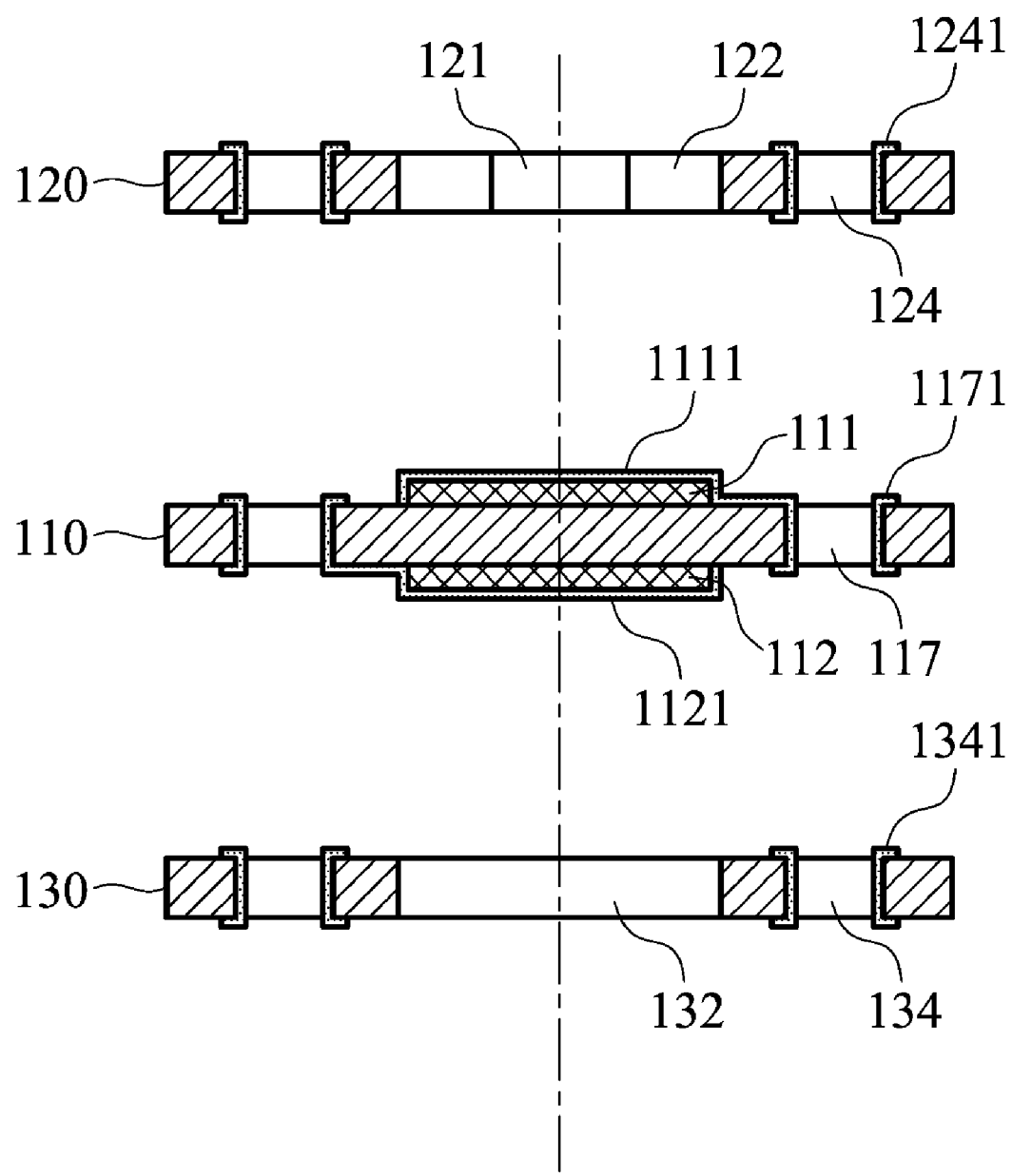
FIG. 3c is a sectional view of the fuel cell along II-II direction of FIG. 2.

FIG. 3c is a sectional view along II-II direction of FIG. 2. With reference to FIG. 2 and FIG. 3c, the substrate layer 110 comprises wire holes 117, the first chamber layer comprises wire holes 124, and the second chamber layer 130 comprises wire holes 134. The wire holes 117, 124 and 134 contain wires 1171, 1241 and 1341 to conduct the electricity generated by the fuel cell.

With reference to FIG. 3a, the first electrode 111 comprises a first collecting film 1111, the first collecting film 1111 is formed on a surface of the first electrode 111, the second electrode 112 comprises a second collecting film 1121, and the second collecting film 1121 is formed on a surface of the second electrode 112.

The substrate layers comprises: (a) cerium oxide or zirconium oxide single-/co-doped with positive ion with +2 or +3 charges; (b) $LaMo_2O_9$; or (c) Perovskite.

The first and second electrodes comprise: (a) Pt, Au, Pd, Rh, Ir, Ru, Os, Ni, Co and Fe; (b) $LaSrMnO_3$ or $LaSrCoFeO_3$; or (c) a compound of cerium oxide and $LaSrMnO_3$, or a compound of cerium oxide and $LaSrCoFeO_3$. In a modified embodiment, the first and second electrodes further comprise a second phase material for resisting carbonization, poisoning or vulcanization, such as copper or cerium oxide.

The first and second chamber layer comprise: (a) cerium oxide or zirconium oxide mixed with positive ion with +2 or +3 charges; (b) $LaMo_2O_9$; (c) Perovskite; (d) magnesium aluminate spinel; (e) lanthanum aluminum oxide; or (f) aluminum oxide The substrate layer, the first electrode, the second electrode, the first chamber layer and the second chamber layer are co-fired by electric furnace, atmosphere furnace, microwave sintering furnace, laser annealing or heat press. The co-firing temperature is between 600° C. and 800° C. (thin film process) or between 1300° C. and 1600° C. (thick film process).

The first and second electrodes are formed by screen print, inject print, spread or lift-off process. The thickness of the first and second electrodes is about 0.01 mm (thick film process) or between 10 μm and 20 nm (thin film process).

In the embodiment of the invention, materials of the substrate layer, the first chamber layer and the second chamber layer are selected to be matched. Additionally, the substrate layer, the first chamber layer and the second chamber layer are co-fired to be integrally formed. The structure strength and reliability of the fuel cell is improved. As well, the fuel cell is easier assembled, and a sealing problem is prevented.

Figure 4A:
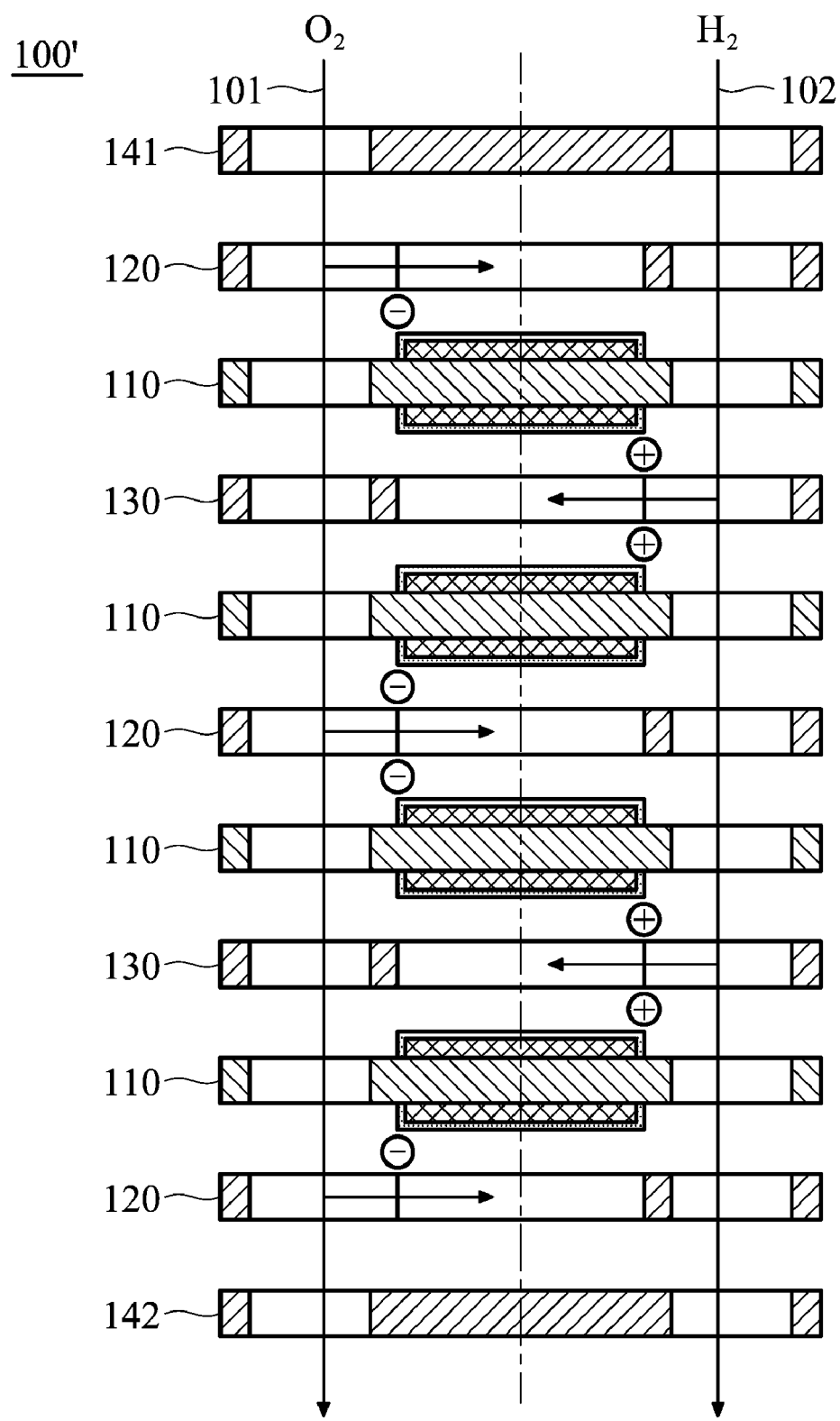
FIG. 4a shows a plurality of fuel cells stringed up as a cell stack.

With reference to FIG. 4a, a plurality of fuel cells can be stringed up as a cell stack 100'. In the cell stack 100', the first gas (oxygen) 101 travels in the fifth flow passage, the first flow passage and the fourth flow passage. The second gas (hydrogen) 102 travels in the sixth flow passage, the second flow passage and the third flow passage. A cover layer 141 is disposed on the top of the cell stack 100', and a cover layer 142 is disposed on the bottom of the cell stack 100'. The cover layer 141 and the cover layer 142 limit flow paths of the first gas (oxygen) 101 and the second gas (hydrogen) 102. The cell stack 100' of the embodiment provides more electricity with a simplified structure and reduced dimension.

Figure 4B:
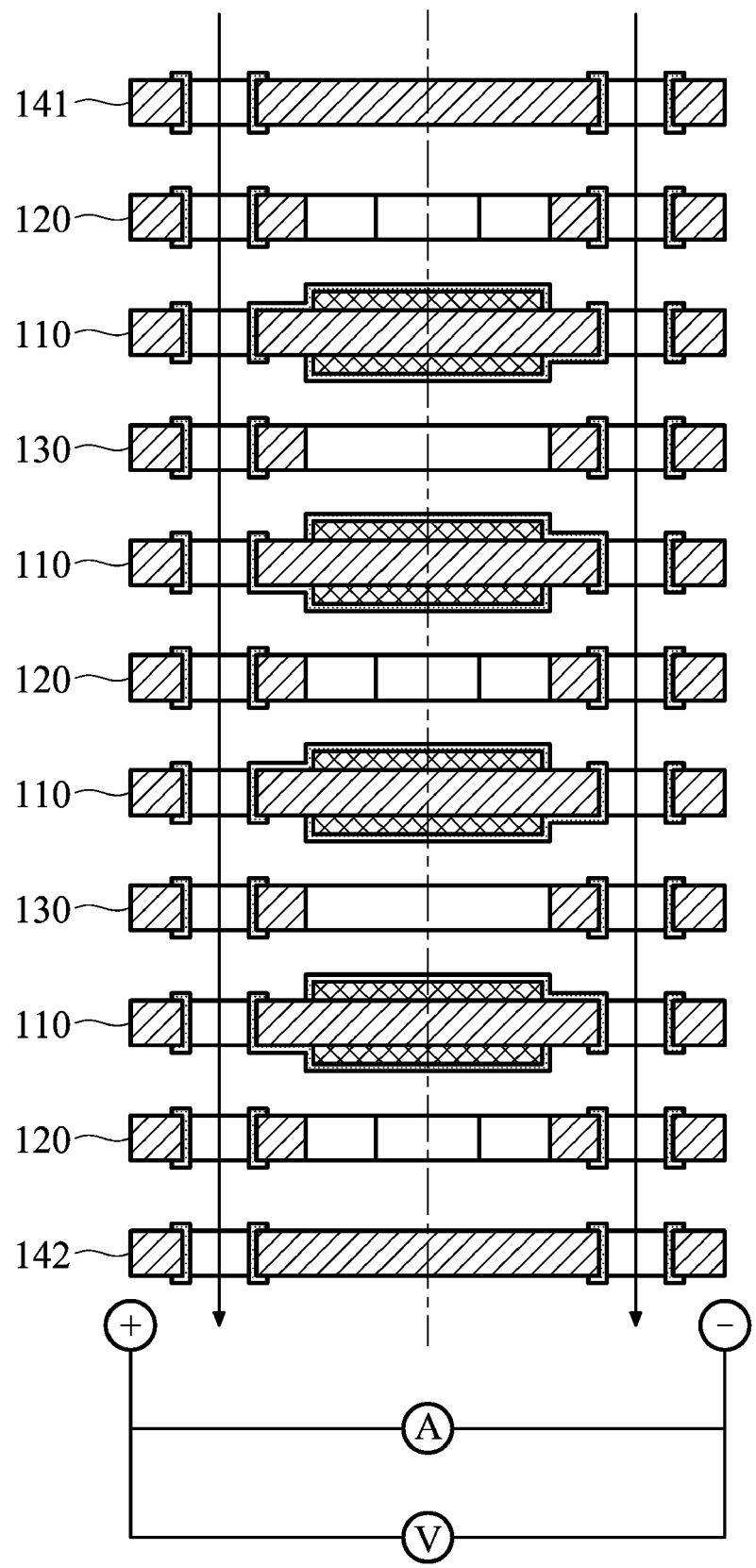
FIG. 4b shows the fuel cells of FIG. 4a, which are parallelly connected.
Figure 4C:
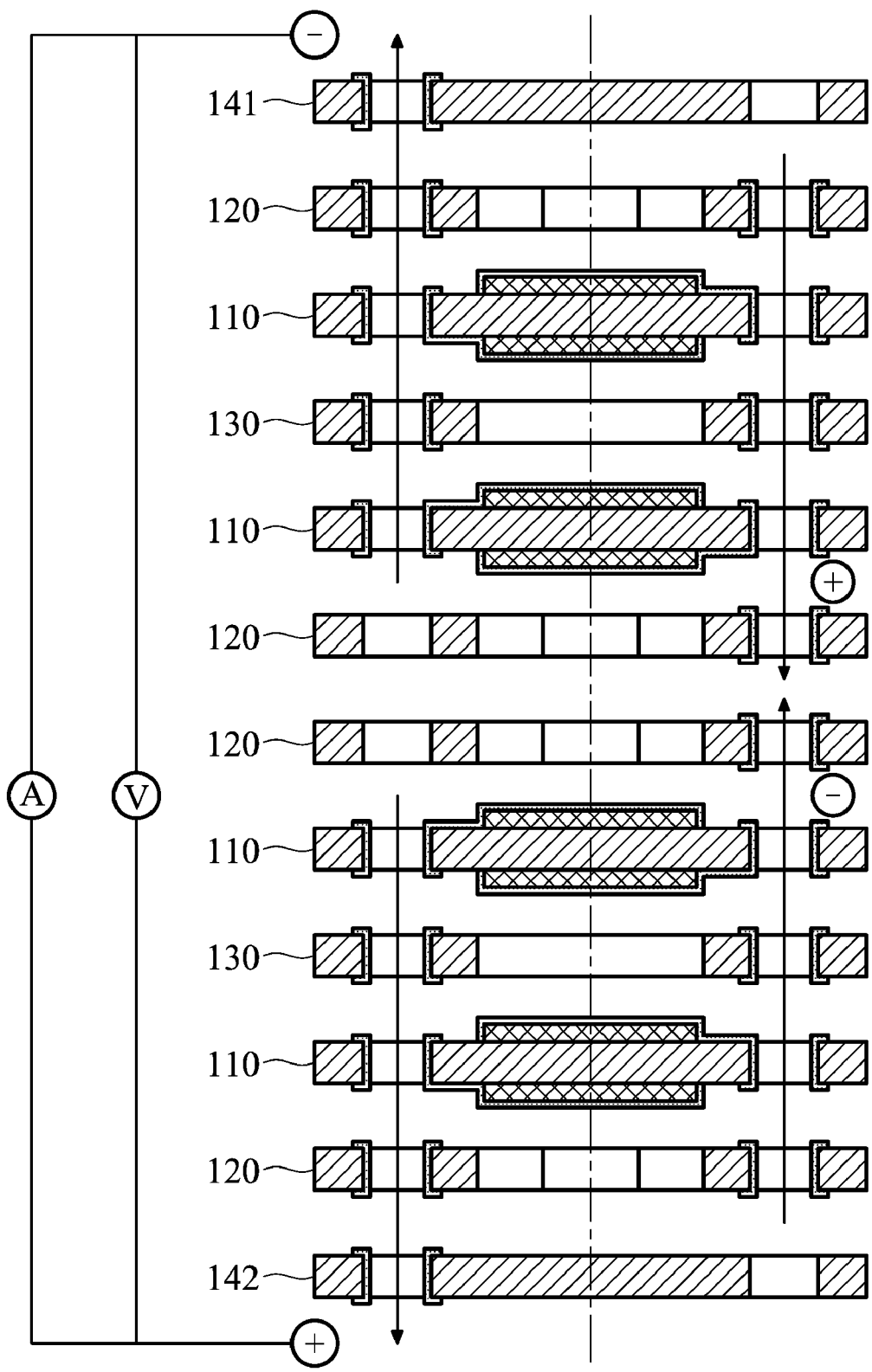
FIG. 4c shows a modified embodiment of the invention, wherein the fuel cells are serially connected.

As shown in FIG. 4b, the fuel cells of FIG. 4a are parallelly connected to provide increased voltage. FIG. 4c shows a modified embodiment of the invention, wherein the fuel cells are serially connected to provide increased voltage.

Figure 5:
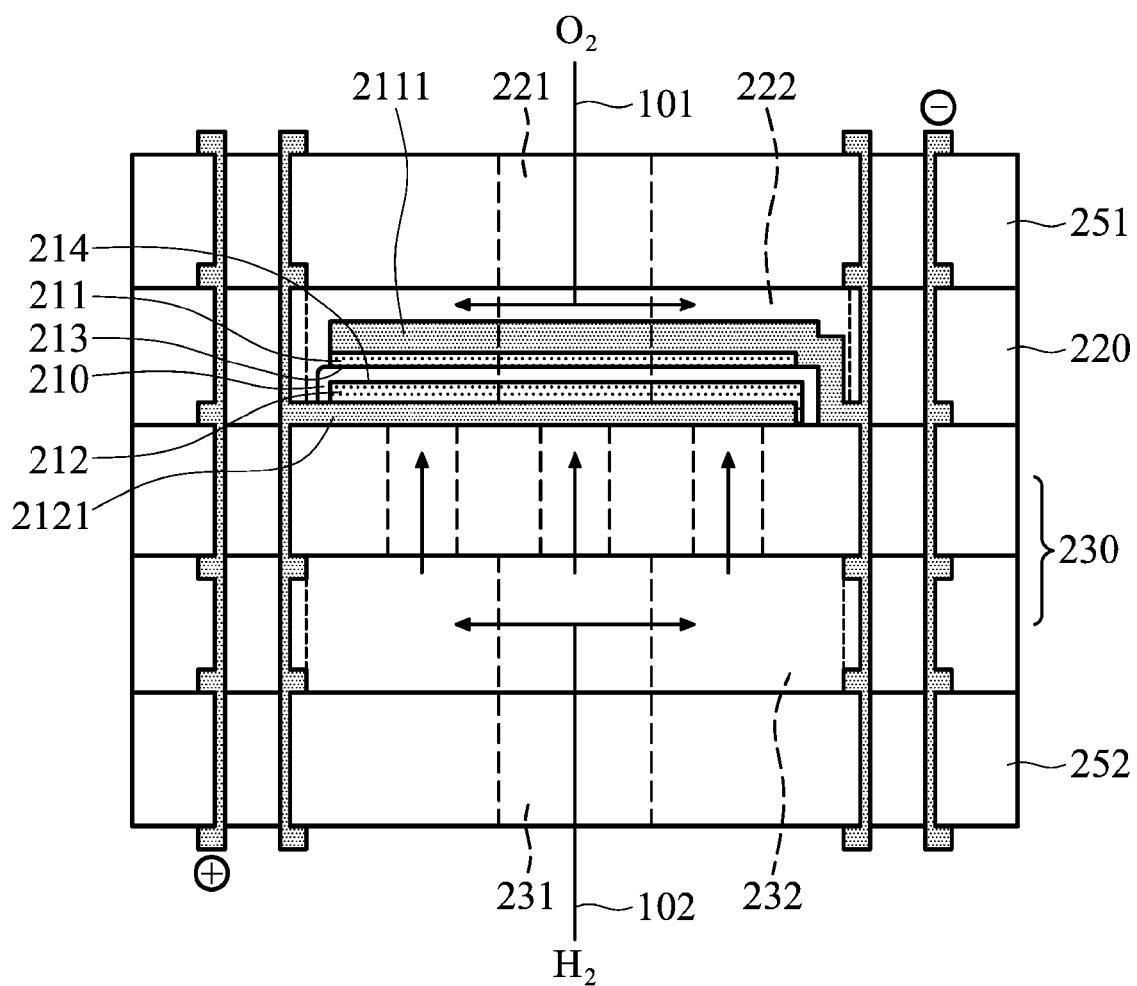
FIG. 5 shows a fuel cell of a second embodiment of the invention.

FIG. 5 shows a fuel cell 200 of a second embodiment of the invention comprising a substrate layer 210, a first electrode 211, a second electrode 212, a first chamber layer 220, a second chamber layer 230, a first cover layer 251 and a second cover layer 252. The substrate layer 210 comprises a first surface 213 and a second surface 214. The first surface 213 is opposite to the second surface 214. The first electrode 211 is formed on the first surface 213. The second electrode 212 is formed on the second surface 214.

The first chamber layer 220 is disposed on the first electrode 211. The first chamber layer 220 comprises a first flow passage 221 and a first fuel chamber 222. The first flow passage 221 is connected to the first fuel chamber 222. A first gas (oxygen) 101 passes the first flow passage 221 entering the first fuel chamber 222 to contact the first electrode 211. The second chamber layer 230 is disposed on the second electrode 212. The second chamber layer 230 comprises a second flow passage 231 and a second fuel chamber 232. The second flow passage 231 is connected to the second fuel chamber 232. A second gas (hydrogen) 102 passes the second flow passage 231 entering the second fuel chamber 232 to contact the second electrode 221. The substrate layer 210, the first electrode 211, the second electrode 212, the first chamber layer 220 and the second chamber layer 230 are combined by co-firing.

The first electrode 211 comprises a first collecting film 2111, the first collecting film 2111 is formed on a surface of the first electrode 211, the second electrode 212 comprises a second collecting film 2121, and the second collecting film 2121 is formed on a surface of the second electrode 212.

In the fuel cell 200 of the second embodiment, the material of the elements and co-firing process are similar to the first embodiment.

Figure 6:
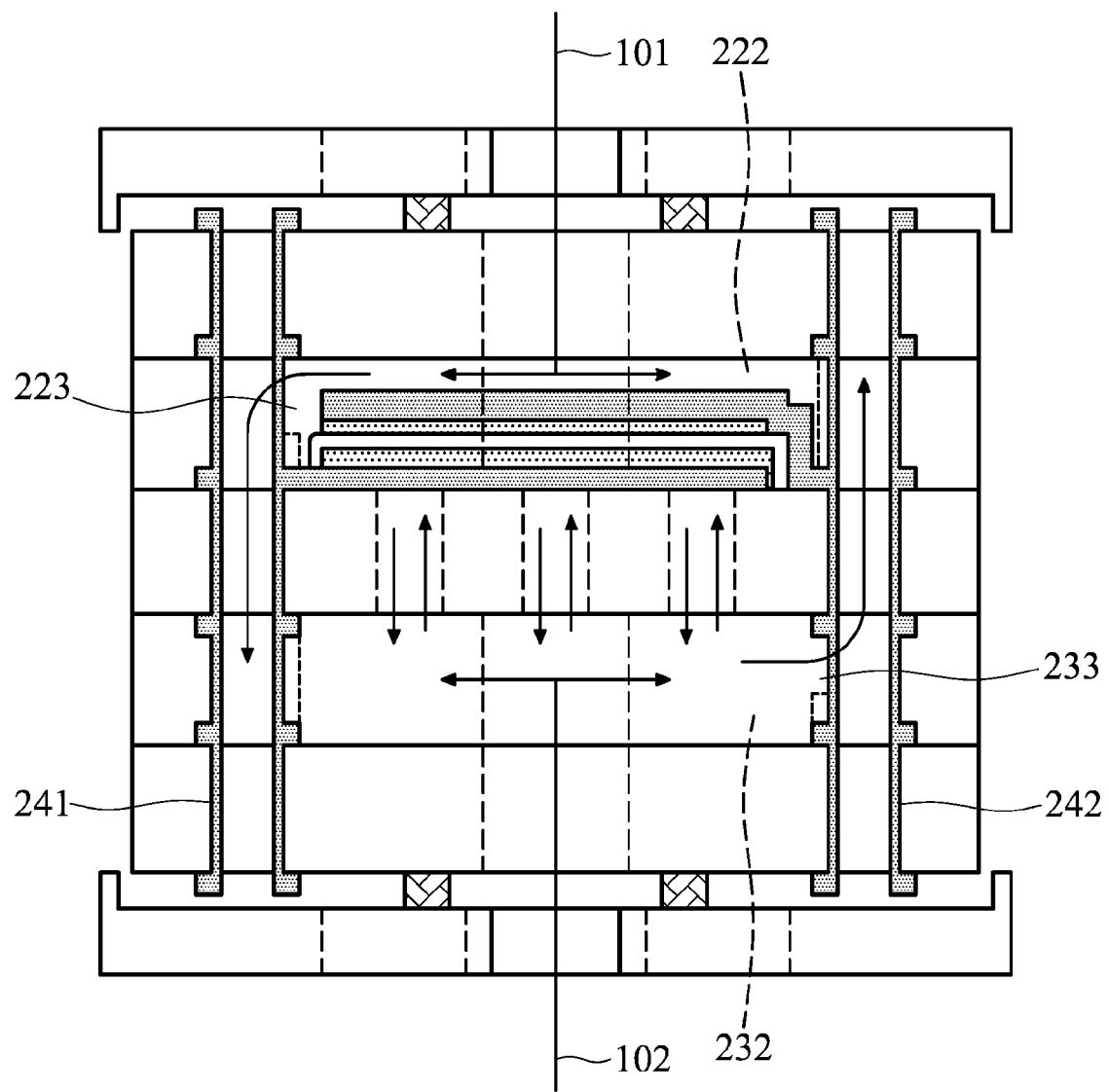
FIG. 6 shows a fuel cell of a modified embodiment of the second embodiment of the invention.

FIG. 6 shows a fuel cell 200' of a modified embodiment of the second embodiment of the invention, wherein the fuel cell 200' comprise a first wire hole 241 and a second wire hole 242. The first wire hole 241 is connected to the first fuel chamber 222 via a connection passage 223 allowing the first gas 101 to travel from the first fuel chamber 222 to the first wire hole 241. The second wire hole 242 is connected to the second fuel chamber 232 via a connection passage 233 allowing the second gas 102 to travel from the second fuel chamber 232 to the second wire hole 242.

Figure 7:
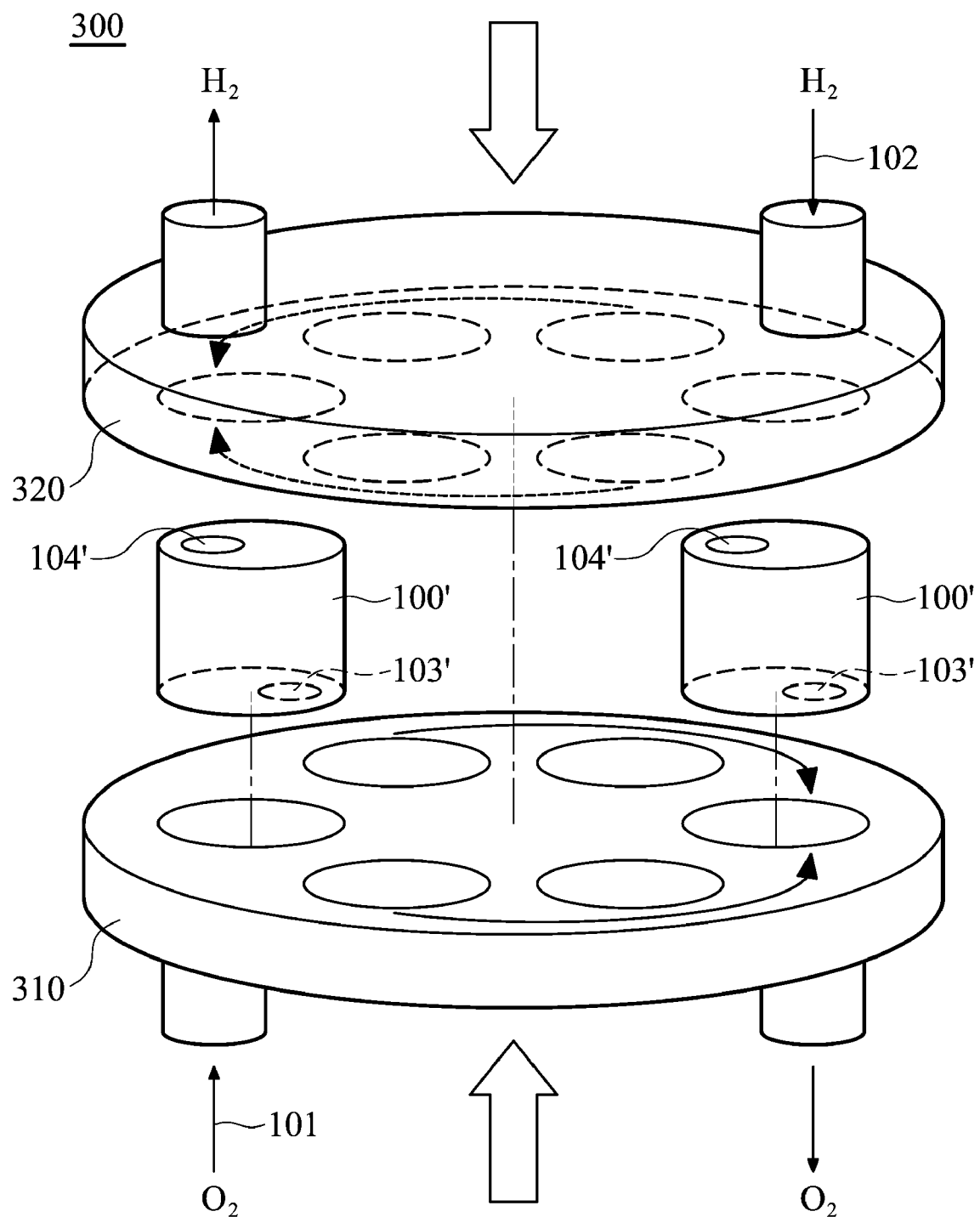
FIG. 7 shows another embodiment of the invention, wherein a plurality of cell stacks are integrated in a cell unit.

FIG. 7 shows another embodiment of the invention, wherein a plurality of cell stacks 100' are integrated in a cell unit 300. The cell unit 300 comprises a first unit chamber 310 and a second unit chamber 320. The cell stacks 100' are parallelly arranged between the first unit chamber 310 and the second unit chamber 320. Each cell stacks 100' comprises a first connection hole 103' and a second connection hole 104'. The first gas (oxygen) 101 travels in the first unit chamber 310. The second gas (hydrogen) 102 travels in the second unit chamber 320. The first gas (oxygen) 101 and the second gas (hydrogen) 102 enter each cell stacks 100' via the first connection hole 103' and second connection hole 104'. In the embodiment of FIG. 7, the cell unit 300 can be serially connected or parallelly connected to provide increased electricity.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fuel cell, comprising:
   a substrate layer, comprising a first surface and a second surface, wherein the first surface is opposite to the second surface;
   a first electrode, formed on the first surface;
   a second electrode, formed on the second surface;
   a first chamber layer, disposed on the first electrode, wherein the first chamber layer comprises a first flow passage and a first fuel chamber, the first flow passage is connected to the first fuel chamber, and a first gas passes the first flow passage, enters the first fuel chamber and contacts the first electrode; and
   a second chamber layer, disposed on the second electrode, wherein the second chamber layer comprises a second flow passage and a second fuel chamber, the second flow passage is connected to the second fuel chamber, and a second gas passes the second flow passage, enters the second fuel chamber and contacts the second electrode, wherein the substrate layer, the first electrode, the second electrode, the first chamber layer and the second chamber layer are integrally formed by co-firing,
   wherein the first chamber layer further comprises a first wire hole, the second chamber further comprises a second wire hole, the first wire hole is connected to the first fuel chamber allowing the first gas to flow in the first wire hole, and the second wire hole is connected to the second fuel chamber allowing the second gas to flow in the second wire hole.

2. The fuel cell as claimed in claim 1, wherein the first chamber layer is disposed on the first surface, and the second chamber layer is disposed on the second surface.

3. The fuel cell as claimed in claim 1, wherein the first chamber further comprises a third flow passage, the second chamber layer further comprises a fourth flow passage, the substrate layer further comprises a fifth flow passage and a sixth flow passage, the fifth flow passage is connected to the first flow passage and the fourth flow passage, and the six flow passage is connected to the second flow passage and the third flow passage.

4. The fuel cell as claimed in claim 1, wherein the first electrode comprises a first collecting film, the first collecting film is formed on a surface of the first electrode, the second electrode comprises a second collecting film, and the second collecting film is formed on a surface of the second electrode.

5. The fuel cell as claimed in claim 1, wherein the first gas is oxygen, and the second gas is hydrogen.

6. The fuel cell as claimed in claim 1, wherein the substrate layer comprises cerium oxide or zirconium oxide mixed with positive ion with +2 or +3 charges.

7. The fuel cell as claimed in claim 1, wherein the substrate layer comprises materials selected from a group of $LaMo_2O_9$ and Perovskite.

8. The fuel cell as claimed in claim 1, wherein the first chamber layer and the second chamber layer comprise materials selected from a group of cerium oxide or zirconium oxide mixed with positive ion with +2 or +3 charges.

9. The fuel cell as claimed in claim 1, wherein the first chamber layer and the second chamber layer comprise materials selected from a group of $LaMo_2O_9$, Perovskite, magnesium aluminate spinel, lanthanum aluminum oxide and aluminum oxide.

10. The fuel cell as claimed in claim 1, wherein the first electrode and the second electrode comprise materials selected from a group of Pt, Au, Pd, Rh, Ir, Ru, Os, Ni, Co and Fe.

11. The fuel cell as claimed in claim 1, wherein the first electrode and the second electrode comprise $LaSrMnO_3$ or $LaSrCoFeO_3$.

12. The fuel cell as claimed in claim 1, wherein the first electrode and the second electrode comprise a compound of cerium oxide and $LaSrMnO_3$, or a compound of cerium oxide and $LaSrCoFeO_3$.

13. A cell stack, comprising:
   a plurality of fuel cells as claimed as claim 1, wherein the fuel cells are stringed up, integrally formed by co-firing and electrically connected with each other.

14. The cell stack as claimed in claim 13, wherein the fuel cells are parallelly connected.

15. The cell stack as claimed in claim 13, wherein the fuel cells are serially connected.

16. A cell device, comprising:
   a first unit chamber, wherein a first gas travels in the first unit chamber;
   a second unit chamber, wherein a second gas travels in the second unit chamber; and
   a plurality of cell stacks, parallelly arranged between the first and second unit chambers, each cell stack comprising a first connection hole and a second connection hole, wherein the first gas enters each cell stacks via the first connection hole, the second gas enters each cell stacks via the second connection hole, and the cell stacks are electrically connected with each other,
   wherein each cell stack comprises a plurality of fuel cells, wherein each fuel cell comprises:
      a substrate layer, comprising a first surface and a second surface, wherein the first surface is opposite to the second surface;
      a first electrode, formed on the first surface;
      a second electrode, formed on the second surface;
      a first chamber layer, disposed on the first electrode, wherein the first chamber layer comprises a first flow passage and a first fuel chamber, the first flow passage is connected to the first fuel chamber, and a first gas passes the first flow passage, enters the first fuel chamber and contacts the first electrode; and
      a second chamber layer, disposed on the second electrode, wherein the second chamber layer comprises a second flow passage and a second fuel chamber, the second flow passage is connected to the second fuel chamber, and a second gas passes the second flow passage, enters the second fuel chamber and contacts the second electrode, wherein the substrate layer, the first electrode, the second electrode, the first chamber layer and the second chamber layer are integrally formed by co-firing,
   wherein the first chamber layer further comprises a first wire hole, the second chamber further comprises a second wire hole, the first wire hole is connected to the first fuel chamber allowing the first gas to flow in the first wire hole, and the second wire hole is connected to the second fuel chamber allowing the second gas to flow in the second wire hole.

17. The cell device as claimed in claim 16, wherein the cell stacks are parallelly connected.

18. The cell device as claimed in claim 16, wherein the cell stacks are serially connected.

* * * * *